Patented Apr. 14, 1936

2,037,011

UNITED STATES PATENT OFFICE 2,037,011

MANUFACTURE OR TREATMENT OF PRODUCTS OR ARTICLES HAVING A BASIS OF CELLULOSE DERIVATIVES AND OF REAGENTS THEREFOR

Henry Dreyfus, London, England

No Drawing. Application May 25, 1933, Serial No. 672,801. In Great Britain June 2, 1932

18 Claims. (Cl. 106—40)

This invention is an improvement in or modification of the invention described in the specification of my U. S. application S. No. 620,545 filed 1st July, 1932, and relates to the manufacture or treatment of products or articles having a basis of cellulose derivatives and also to the manufacture of reagents therefor.

In the specification of my said application I have described the manufacture and treatment of products or articles made of or containing cellulose derivatives with the aid of oxanones, that is to say cyclic compounds containing a ring which consists of a keto group, an ether oxygen atom and four methylene or substituted methylene groups. The solvent, softening or plasticizing action of these compounds upon cellulose derivatives may be utilized for a very wide variety of purposes.

I have now found that cyclic oxo-ketones in general, i. e. compounds of the formula:—

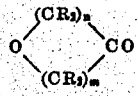

wherein any R may be hydrogen or other atom or group and $m$ and $n$ are 1, 2, 3 or other integers, have a solvent, softening or plasticizing action upon cellulose derivatives, and the new invention is based upon this discovery. The invention further includes the manufacture of cyclic oxo-ketones, including the oxanones of the parent specification.

As previously indicated the invention contemplates quite broadly processes and products utilizing the solvent, softening or plasticizing properties of the cyclic oxo-ketones, except the oxanones, for cellulose derivatives.

A very important aspect of the present invention consists in employing the oxo-ketones as solvents, softening or plasticizing agents in dopes, varnishes, lacquers or the like containing nitrocellulose, cellulose acetate or other cellulose esters or ethers and in solutions for the manufacture of artificial filaments, ribbons, films, foils, sheets and the like by dry or wet processes. In such applications the compounds of the present invention may be used as low or medium boiling solvents or as high boiling solvents or plasticizers, and for the purpose of making up dopes, varnishes, lacquers and the like they may be employed in conjunction with other solvents and/or diluents, for example, acetone, methyl acetone, methyl acetate, methyl formate, ethyl acetate, the ethers and esters and ether-esters of olefine and polyolefine glycols, for instance the monomethyl and ethyl ethers of ethylene and propylene glycol and ethylene glycol mono-acetate and methyl glycol mono-acetate, methylene chloride, ethylene chloride, dichlorethylene, trichlorethylene, chloroform, methyl, ethyl or other alcohols, hydrocarbons, and ethers, for instance iso-propyl ether. Where very high volatility is desired acetaldehyde or other very low boiling solvents may be used.

In the manufacture of dopes, lacquers and the like the oxo-ketones of the present invention may constitute the high boiling solvents or plasticizers, in which case the dope or lacquer will usually include low and medium boiling solvents, for example those mentioned above, and may include diluents. The oxo-ketone plasticizers may be the sole plasticizers present, or the compositions may contain other high boiling solvents or plasticizers, for example triacetin, diethyl phthalate, dibutyl phthalate, sulphonamides, for example alkylated xylene sulphonamides, sulphonanilides, tartrates, for instance dibutyl or di-isoamyl tartrate, or diphenylol propane, triphenyl phosphate, tricresyl phosphate (the latter two preferably in conjunction with sulphonamides, tartrates or other highly compatible plasticizers), or other phenolic plasticizers. Other medium boiling solvents which may be used together with the lower or medium boiling cyclic oxo-ketones in dopes, lacquers and the like or together with high boiling cyclic oxo-ketone plasticizers include ethyl lactate, diacetone alcohol and tetrachlorethane. Diluents, for example toluene, xylene or other relatively cheap hydrocarbons or other non-solvents for the cellulose derivatives, may be incorporated in the dopes, varnishes, lacquers, spinning solutions or the like within the range of tolerance of such solutions.

The dopes, varnishes, lacquers, film-forming compositions, spinning solutions and the like may contain any other desired constituents, for example dyestuffs, pigments (coloured or white) or resins, for instance dammar, shellac, fusible soluble phenol-aldehyde resins including the diphenylol propane formaldehyde type of synthetic resin, ketone phenol resins, polyvinyl resins, urea or thiourea-formaldehyde resins, sulphonamide aldehyde resins, and the resins obtained from glycerine and other polyhydric alcohols and phthalic acid and other poly-basic acids. The compositions may further include substances adapted to reduce flammability, for example halogenated and especially brominated organic compounds, for instance brominated acidylated aromatic amines, e. g. tribromacetanilide.

In the manufacture of artificial filaments, ribbons, films and the like employing the cyclic oxo-ketones as solvents or softening agents, the cyclic oxo-ketone may be the sole solvent present in the spinning solution or it may be present in conjunction with other solvents, for example acetone or mixtures of acetone with alcohol, or of methylene chloride or ethylene chloride with alcohol. The invention includes broadly processes in which the cyclic oxo-ketone is present in the spinning solution itself and/or in which it is present in the coagulating bath as described broadly in U. S. application S. Nos. 402,785 filed 26th October, 1929 and 418,414 filed 3rd January, 1930 and U. S. Patent No. 1,467,493, or alternatively the cyclic oxo-ketones may be present in a subsequent treatment bath according to the processes described in U. S. application S. No. 402,785 filed 26th October, 1929.

In the manufacture of plastics and moulding powders the cyclic oxo-ketones are especially useful as plasticizing agents. The plasticizer may, for example, be dissolved in a suitable liquid which may be a non-solvent or a solvent for the cellulose derivative and the solution may be sprayed or otherwise incorporated with the cellulose derivative and the mass worked on rolls in the customary manner. A mixture of benzene and alcohol is a particularly useful mixture for dissolving the plasticizing agents of the invention and for incorporating them in the cellulose derivatives. Alcohol itself may be used similarly or other liquids which are solvents for the cyclic oxo-ketones and are non-solvents or have a relatively low solvent or softening action upon the cellulose derivative.

In addition to being of value in the working up of cellulose esters and ethers into any desired products as described above the solvents, softening agents or plasticizers of the present invention are also highly valuable for the treatment of already formed articles made of or containing cellulose derivatives, for example filaments, yarns, threads, ribbons, films, fabrics and the like. Such treatments may have various objects. For example the tendency of woven fabrics to slip or of warp or circular knitted fabrics to split or ladder may be diminished or eliminated by treatment with the cyclic oxo-ketones of the present invention in the manner described in U. S. application S. No. 152,516 filed 3rd December, 1926. The solvents may be used to improve the pliability or extension of filaments, threads and the like made of or containing cellulose derivatives, and in particular to improve the knotting properties of comparatively thick filaments or artificial horse-hair. Such treatment with the cyclic oxo-ketones is preferably effected without tension or only under a light tension so that the materials are able to shrink. Shrinking of the filaments, yarns and the like either to improve their extension or their pliability is particularly important in relation to the treatment of filaments or the like of low extension produced by wet spinning processes, or filaments or the like of low extension produced by the stretching of dry-spun products. Such shrinking processes are described broadly in U. S. application S. No. 611,240 filed 13th May, 1932.

The cyclic oxo-ketones may further be employed for the purpose of improving the tenacity of filaments or other products of cellulose acetate or other cellulose derivatives. In such an application the filaments or other products during or subsequent to softening with the cyclic oxo-ketones or mixtures containing the same are subjected to a stretching treatment. The softening of the filaments or other products may be effected by treatment with the cyclic oxo-ketones or solutions thereof, or the cyclic oxo-ketones may be incorporated in the materials by incorporating them in the spinning solution and spinning under such conditions that the proportion of cyclic oxo-ketone requisite to produce the desired degree of softening is retained in the filaments. Thus the required proportion may be incorporated in the spinning solution and the latter spun by dry spinning methods. The stretching treatment of the softened filaments or other products may be applied in a single operation and preferably gradually, or may be applied in a number of stages, preferably without intermediate elimination of the solvent as described in U. S. application S. No. 402,785 filed 26th October, 1929. From the point of view of producing regularity of stretch and also for reasons of economy it is particularly advantageous to stretch the filaments or other products while they are in warp formation by applying the stretching force to the warp as a whole. Such a process is described in U. S. application S. No. 602,844 filed 2nd April, 1932.

For the treatment of filaments, yarns and the like of cellulose derivatives, sizes may be made up containing the cyclic oxo-ketones so as to effect a lubrication of the yarns or other materials, particularly for facilitating textile operations, such as winding, winding and twisting, beaming and the like. Such sizes may be made up with or without suitable thickening agents, such as polymerized vinyl compounds or oxidized linseed oil or other drying oils.

The cyclic oxo-ketones are also of considerable value in processes involving the absorption of various liquid or solid materials by filaments, yarns, threads, fabrics and the like containing the cellulose esters or ethers. For example such products may be treated with the cyclic oxo-ketones during or before the treatment adapted to dye, print, discharge, load, mordant or apply delustering compounds to the materials, the absorption of the dyes, loading agents, mordanting agents, discharges, delustering compounds being facilitated or rendered possible by the aid of the solvents. Thus, for instance, a large number of solid agents have little or no affinity for cellulose acetate, and by means of the cyclic oxo-ketones such substances may be incorporated in the materials by dyeing, printing, stenciling or mechanical impregnation methods. Examples of such substances include certain basic dyestuffs which have relatively little affinity especially in printing processes, the acid wool and direct cotton dyestuffs, certain vat dyestuffs, pigments (white or coloured) for example titanium oxide, and certain discharges, for example the formaldehyde sulphoxylate discharges. Again in the treatment of yarns, fabrics etc. the cyclic oxo-ketones of the present invention may be utilized to reluster fabrics or other materials containing cellulose acetate or other esters or ethers of cellulose which have been delustered by the action of moist steam or of hot aqueous media, and reference is made in this connection to U. S. Patent No. 1,808,098. Such relustering may be uniformly applied over the whole fabric or material, or may be local so as to produce an effect fabric. The cyclic oxo-ketone may for instance be printed with the aid of a suitable thickening agent on the delustered fabric and the whole dried to reluster the fabric in the printed portions. Dyestuffs, pigments, discharges or other effect materials may be included in the printing paste.

In the above applications of the cyclic oxo-ketones of the present invention to already formed products made of or containing cellulose acetate or other cellulose esters or ethers, the cyclic oxo-ketones may be employed as such, particularly where they are liquids and their solvent power has been reduced by suitable substituent groups, as for instance alkyl groups. Or where their solvent power is too great they may be mixed with suitable diluents, for example hydrocarbon diluents of the aliphatic, aromatic or cyclo-aromatic series, ethers, alcohols, water and the like. Furthermore the cyclic oxo-ketones may of course be mixed with other solvents.

The invention is particularly important in relation to the manufacture of artificial silk, ribbon, films, dopes, lacquers, plastics, moulding powders and the like, and the treatment of filaments, fabrics and other formed products of cellulose acetate, but it may also be applied to the manufacture and treatment of similar products of cellulose nitrate and also of cellulose formate, cellulose propionate, cellulose butyrate, cellulose nitroacetate (of low nitrogen content) and other organic esters of cellulose or mixed esters, and also ethyl or benzyl celluloses or other cellulose ethers or mixed ethers or mixed ether-esters.

As previously indicated the invention also includes the manufacture of the above cyclic oxo-ketones and also the oxanones of the parent specification. I have found that these bodies may be prepared by a variety of methods, the particular method adopted being dependent to some extent upon the accessibility or ease of manufacture of the starting material.

Thus the cyclic oxo-ketones may be manufactured by the dehydration of dioxy-ketones, for example dioxy acetone and 1.3-dioxy-2-butanone. These dioxy ketones and other dioxy ketones may be manufactured from the calcium or other alkaline earth salts of the corresponding oxy carboxylic acids, for example glycollic acid, lactic acid, hydracrylic acid or the like or from the salts of the oxy carboxylic acids with metals in general whose acetates are capable of yielding acetone. Such manufacture may involve a simple heating of the compound. If the degree of volatility of the dioxy ketone obtained by such heating is not sufficient to admit of the compound being separated from the reaction mass by distillation, other methods, for example extraction with solvents, may be resorted to. To obtain the desired cyclic oxo-ketone the dioxy ketone may, for example, be treated with any suitable dehydrating agent. Thus for instance in reactions effected in the liquid phase, zinc chloride and meta- or pyro-phosphoric acid and pyro-sulphates or pyrophosphates are very suitable, while if the dioxy ketone is sufficiently volatile its vapour may be passed over a dehydrating catalyst such as for example alumina, zinc chloride, sodium pyrosulphate or the like heated to a suitable temperature, for example 200–400° C. Such dehydration may take place continuously with the manufacture of the dioxy ketone.

Instead of forming the dioxy ketone from the oxy carboxylic acid, the latter may be first treated to obtain the corresponding ether, i. e. a di-carboxylic acid of an ether. Such a process may be carried out with the aid of dehydrating agents, for instance sulphuric acid, phosphoric acid or any of the other dehydrating catalysts previously mentioned, and the acids may, if desired, be esterified before being subjected to dehydration. Alternatively the dicarboxylic acids of ethers formed by any other process, for example, by condensing the ester of a halogen carboxylic acid with the ester of an oxycarboxylic acid by means of sodium or a sodium alkylate e. g. sodium ethylate, in alcohol and hydrolyzing the ester groups from the product, may be subjected to ketone transformation. The dicarboxylic acid may for instance be heated in presence of soda-lime, lime, baryta or other alkaline earth reagents or other compounds of metals whose acetates form acetone so as to form a corresponding cyclic oxo-ketone. If desired, the calcium or other salt of the ether dicarboxylic acid may be formed previous to applying the heat. In general in such thermal decomposition of the calcium or other salts of the ether dicarboxylic acids the cyclic oxo-ketone is the most volatile of the substances produced by such decomposition so that it may be removed as it is formed by distillation. Examples of starting materials for this method of manufacturing the cyclic oxo-ketones are dimethyl ether-αα'-di-carboxylic acid (diglycollic acid), methyl ethyl ether-αα'-dicarboxylic acid, diethyl ether-αα'-dicarboxylic acid, diethyl ether-ββ'-dicarboxylic acid, ethyl propyl ether-αα' dicarboxylic acid, ethyl iso-propyl ether-αα'-dicarboxylic acid, dipropyl ether-αα'-dicarboxylic acid, di-isopropyl ether-αα'-dicarboxylic acid and the symmetrical dimethyl-diethyl diglycollic acid.

Instead of forming the cyclic oxo-ketones from salts of ether dicarboxylic acids they may be formed directly from esters of the acids by treatment thereof under the conditions of the Claisen synthesis. For example, by treatment, preferably in a neutral medium, with sodium of the carefully dried diethyl ester,

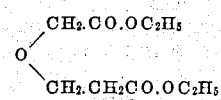

obtained by condensing the ethyl esters of chloracetic and hydracrylic acids by means of sodium or sodium ethylate in alcohol, the ethyl ester of a carboxylic acid derivative of the (five-membered ring) oxo-ketone is produced.

A further method of manufacture consists in the splitting off of hydrochloric acid, hydrobromic acid or the like from halogenalkyl-oxyalkyl ketones or from the alkyl ethers of oxy carboxylic acid halides. Such condensations may for example be effected with the aid of soda-lime, caustic soda, sodium or potassium carbonate, chalk, sodium acetate and the chlorides of aluminium, antimony, iron and copper. The condensation may take place in the liquid phase in which the starting material is the sole reagent present, but preferably it is carried out in a medium inert to the condensing agent and to the starting material, for example in a medium of carbon bisulphide, ether, isopropyl ether, petrol ether, nitro benzene or benzene. In general it is advisable in this condensation to keep the temperature fairly low. Examples of starting materials which may be employed in such condensation are γ-chlor-β-keto-α-oxypropane, δ-chlor-γ-keto-β-oxy-β-methyl-butane, the ethyl ether of glycollic acid chloride, the isobutyl ether of glycollic acid chloride, and α-ethoxy-n-valeric acid chloride.

A further method which may be utilized for producing the cyclic oxo-ketones of the present invention consists in the treatment of poly halogenated ketones in which at least one halogen atom is present on each side of the ether atom with agents adapted to remove the halogen and substitute oxygen therefor. Such agents are for example silver oxide, cupric oxide, litharge, mercuric oxide and other agents according to my U. S. application S. No. 593,860 filed 18th February, 1932, and in fact the conditions of the reaction may be very similar to those described in the said specification. As examples of compounds which may be treated by the said processes may be mentioned αα'-dichlor-acetone, α.γ-dichlor-β-keto-butane, α.γ-dibrom-β-keto-butane, β.δ-dichlor-γ-keto-β-methyl-butane, β.δ-dibrom-γ-keto-β-methyl-butane, β.γ-dibrom-γ-ketone-pentane.

As previously indicated the invention includes quite broadly the manufacture of the cyclic oxo-ketones, including the oxanones of the parent specification, by any of the above methods.

The following examples show the production of oxo-ketones according to the invention, but it is to be understood that these examples are given solely by way of illustration and that the invention is in no way limited to the particular bodies described therein, nor to the particular conditions indicated for their production.

Example 1

A cyclic oxo-ketone containing four carbon atoms is obtained as follows:—1.3-dioxy-2-butanone, mixed with about twice its weight of pyrophosphoric acid, is heated slowly to 200 to 210° C. in a vessel provided with an outlet connected to a condenser and receiver. The cyclic oxo-ketone distills over and is collected in the receiver.

Example 2

Oxanone, i. e. the diethylene oxo-ketone, is obtained from the calcium salt of diethyl ether ββ'-dicarboxylic acid by dry distillation at a temperature of about 350–450° C. the vapours evolved being passed into a water cooled condenser.

Example 3

δ-chlor-γ-keto-β-oxy-β-methyl-butane is run slowly into boiling dilute (about 20%) caustic potash. The dimethyl dimethylene oxo-ketone distills over together with water from which it may be freed by fractionation.

Example 4

To 100 parts by weight of anhydrous aluminium chloride mixed with 150 parts of carbon bisulphide contained in a vessel fitted with a reflux condenser, 100 parts of the ethyl ether of glycollic acid chloride are slowly added. When all the acid chloride has been added the reaction mixture is warmed until practically no more hydrogen chloride is evolved.

About 250 parts, by weight, of water is added to the reaction product and the mixture well stirred. Carbon bisulphide forms a separate layer which is decanted. The residue is then distilled free from the cyclic oxo-ketone formed (containing four carbon atoms) which distills over with some water.

Example 5

αγ-dichlor β-keto-butane is boiled under reflux with about half its weight of copper oxide for one to two hours.

The reaction product is then distilled free of the cyclic keton produced which is the monomethyl derivative of the dimethylene oxo-ketone.

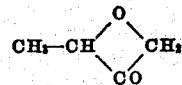

The following examples illustrate the employment of cyclic oxo-ketones other than oxanones, but it will be appreciated that the proportions of reagents used in these examples are not intended in any way to limit the invention nor is the invention limited to the applications of the solvent, softening or plasticizing properties of the oxyketones given in these examples.

Example 6

A plastic mass of cellulose acetate and an oxanone plasticizer may be made up by any of the customary methods used in the art. For example 30–35 parts of the cyclic oxo-ketone having the formula:—

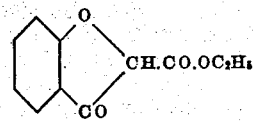

are dissolved in 100 parts of a mixture of benzene and alcohol in the proportions of about 50 parts of each. The solution is sprayed or otherwise incorporated with about 100 parts of acetone-soluble cellulose acetate and the incorporation is carried out as is usual on malaxating rollers, the benzene-alcohol being evaporated or allowed to evaporate during the malaxation or afterwards to obtain the plasticized mass which may then be moulded into sheets, rods, blocks or other articles which may be seasoned as usual.

The cyclic oxo-ketone employed in this example may be prepared by condensing ethyl salicylate with ethyl chloracetate by heating with sodium or sodium alcoholate in alcohol and then warming a carefully dried solution in benzene of the product (phenoxyacetic-o-carboxylic) diethyl ester, with more sodium.

Example 7

The following example illustrates a composition which may be used as a lacquer for coating articles of any kind and it may be used to provide insulation for electrical conductors:—

| | Parts |
|---|---|
| Cellulose acetate | 50 |
| Polymerized vinyl acetate | 50 |
| The body (structure) | 35 |
| Acetone | 500 |
| Alcohol | 250 |
| Benzene | 250 |

Example 8

A composition is prepared as follows:—

| | Parts |
|---|---|
| Cellulose acetate | 100 |
| Diphenylol propane formaldehyde synthetic resin | 20 |
| Tricresyl phosphate | 15 |
| Diphenylol propane | 20 |
| Acetone | 500 |
| Ethylene-methylene oxo-ketone | 300 | and may be utilized for the same purposes as the composition in the preceding example.

*Example 9*

A further lacquer composition may be made up as follows:—

| | Parts |
|---|---|
| Nitro cellulose | 100 |
| Diphenylol propane formaldehyde resin | 20 |
| The body 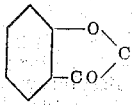 | 20 |
| Triphenyl phosphate | 20 |
| Acetone | 100 |
| Butyl acetate | 900 |

*Example 10*

The following example illustrates a lacquer composition capable of producing a highly flexible film or coating particularly suitable for covering rubber insulated cables and the like:—

| | Parts |
|---|---|
| Cellulose acetate | 100 |
| Diphenylol propane formaldehyde resin | 30 |
| Dibutyl tartrate | 200 |
| Tricresyl phosphate | 15 |
| Acetone | 500 |
| Dioxane | 100 |
| Ethylene-methylene oxo-ketone | 30–40 |

*Example 11*

A composition prepared from

| | Parts |
|---|---|
| Cellulose acetate | 100 |
| Acetone | 300 |
| Ethylene-methylene oxo-ketone | 30–40 | is spun by ordinary dry spinning into filaments. The filaments owing to their content of oxanone may be drawn out to very fine deniers, and in order to assist this operation the filaments before complete drying may be carried round light rollers, glass rods or the like in order to provide a resistance beyond which a further stretch may be applied.

*Example 12*

A 25% solution of cellulose acetate in acetone is extruded through spinning nozzles into a coagulating bath consisting of a 30–40% aqueous, alcohol or aqueous-alcohol solution of ethylene-methylene oxo-ketone. The soft filaments after emergence from the coagulating bath are carried through a guide to a rotating roller having a peripheral speed of 50–70 metres per minute. The filaments may be drawn down to very fine deniers. After leaving the feed roller the excess ethylene-methylene oxo-ketone is removed, as for example by washing it with a more dilute solution of ethylene-methylene oxo-ketone, for instance a 10–15% solution, and the filaments are finally dried. In this example the spinning solution may contain ethylene-methylene oxo-ketone, e. g. 10% on the weight of the cellulose acetate.

*Example 13*

Filaments or yarns of cellulose acetate in hank or other suitable form are soaked for about 2 minutes in a bath consisting of 30–40% aqueous alcohol or aqueous-alcoholic solution of ethylene-methylene oxo-ketone and are thereafter stretched to the desired degree, for example by more than 100% of their original length. The stretching is preferably carried out slowly, and by providing a bath of suitable length to enable the softening to take place the stretching may be applied to travelling filaments, for example filaments in warp formation.

*Example 14*

A fabric consisting of cellulose acetate yarns and either delustered or of a normal lustre is printed with the following printing paste:—

| | Grams |
|---|---|
| Dyestuff or pigment | 10–35 |
| Diethylene glycol | 60–75 |
| Water | 160 |
| Ethylene methylene oxo-ketone | 200–500 |
| Gum arabic (1:1) | 400–600 |

The dyestuff or pigment may be a typical cellulose acetate dyestuff, as for example a dyestuff of the amino anthraquinone series, or a nitro diarylamine, or may be an acid wool or direct cotton dyestuff, or a pigment may be used, such as titanium oxide. After printing the fabric is dried at a temperature of 85–95° C. for a sufficient time to cause the oxanone to evaporate and is then washed with warm water, soaped for a few minutes at 50° C. in a solution containing 2½ grams of soap per litre and finally rinsed. Where a delustered fabric has been used and the printing paste includes a dyestuff, the lustre of the printed areas is restored.

What I claim and desire to secure by Letters Patent is:—

1. A composition of matter containing a cellulose derivative and a compound of formula

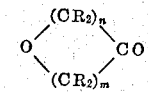

wherein any R may be hydrogen or other atom or group and $m$ and $n$ are 1, 2, 3 or other integers.

2. A composition of matter containing an organic derivative of cellulose and a compound of formula

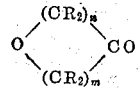

wherein any R may be hydrogen or other atom or group and $m$ and $n$ are 1, 2, 3 or other integers.

3. A composition of matter containing cellulose acetate and a compound of formula

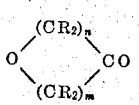

wherein any R may be hydrogen or other atom or group and $m$ and $n$ are 1, 2, 3 or other integers.

4. A composition of matter containing cellulose acetate and a compound of formula

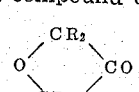

wherein any R may be hydrogen or other atom or group.

5. A composition of matter containing cellulose acetate and a compound of formula

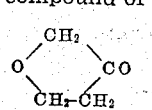

6. A composition of matter containing cellulose acetate and a compound of formula

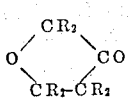

wherein any R may be hydrogen or other atom or group, which compound contains an esterified carboxylic substituent group.

7. A composition of matter containing cellulose acetate and a compound of formula

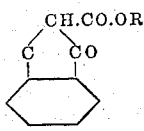

wherein R is a lower alkyl group.

8. Thermoplastic compositions and articles made therefrom containing cellulose acetate and a compound of formula

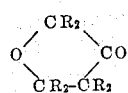

wherein any R may be hydrogen or other atom or group.

9. Thermoplastic compositions and articles made therefrom containing cellulose acetate and a compound of formula

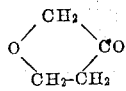

10. Thermoplastic compositions and articles made therefrom containing cellulose acetate and a compound of formula

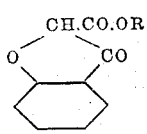

wherein R is a lower alkyl group.

11. Filaments, ribbons, films, foils, sheets and similar articles containing cellulose acetate and a compound of formula

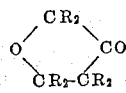

wherein any R may be hydrogen or other atom or group.

12. Filaments, ribbons, films, foils, sheets and similar articles containing cellulose acetate and a compound of formula

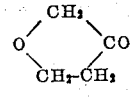

13. Filaments, ribbons, films, foils, sheets and similar articles containing cellulose acetate and a compound of formula

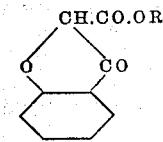

wherein R is a lower alkyl group.

14. In a process for the manufacture of compositions and articles containing a cellulose derivative by a process involving the dissolving, softening or plasticizing of said cellulose derivative, the step of effecting said operation with the aid of a compound of formula

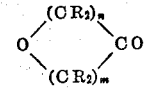

wherein any R may be hydrogen or other atom or group and $m$ and $n$ are 1, 2, 3 or other integers.

15. In a process for the manufacture of compositions and articles containing cellulose acetate by a process involving the dissolving, softening or plasticizing of said cellulose acetate, the step of effecting said operation with the aid of a compound of formula

wherein any R may be hydrogen or other atom or group and $m$ and $n$ are 1, 2, 3 or other integers.

16. In a process for the manufacture of compositions and articles containing cellulose acetate by a process involving the dissolving, softening or plasticizing of said cellulose acetate, the step of effecting said operation with the aid of a compound of formula

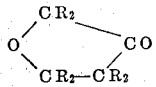

wherein any R may be hydrogen or other atom or group.

17. In a process for the manufacture of compositions and articles containing cellulose acetate by a process involving the dissolving, softening or plasticizing of said cellulose acetate, the step of effecting said operation with the aid of a compound of formula

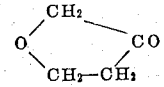

18. In a process for the manufacture of compositions and articles containing cellulose acetate by a process involving the dissolving, softening or plasticizing of said cellulose acetate, the step of effecting said operation with the aid of a compound of formula

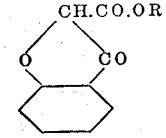

wherein R is a lower alkyl group.

HENRY DREYFUS.

CERTIFICATE OF CORRECTION.

Patent No. 2,037,011.                                         April 14, 1936.

HENRY DREYFUS.

It is hereby certified that error appears in the printed specification of the above numbered patent requiring correction as follows: Page 4, second column, line 1, for "keton" read ketone; page 6, first column, line 16, claim 7, in the formula, for the first "C" between the bonds read O; and that the said Letters Patent should be read with these corrections therein that the same may conform to the record of the case in the Patent Office.

Signed and sealed this 2nd day of June, A. D. 1936.

Leslie Frazer (Seal)                             Acting Commissioner of Patents.